United States Patent [19]

Kautt

[11] Patent Number: 5,018,264
[45] Date of Patent: May 28, 1991

[54] MACHINE FOR FITTING SEALS INTO A GROOVE

[75] Inventor: Jean-Jacques Kautt, Strasbourg, France

[73] Assignee: Ferco Internatioinal Usine De Ferrures De Batiment, Sarrebourg, France

[21] Appl. No.: 482,718

[22] Filed: Feb. 21, 1990

[30] Foreign Application Priority Data

| Mar. 9, 1989 | [FR] | France | 89 03090 |
| Apr. 11, 1989 | [FR] | France | 89 04735 |
| Nov. 28, 1989 | [FR] | France | 89 15650 |

[51] Int. Cl.⁵ .................. B23P 21/00; B23Q 15/00
[52] U.S. Cl. .................. 29/564.8; 29/235; 414/744.3
[58] Field of Search .......... 29/564.8, 564.6, 33 R, 29/235, 450, 452, 460, 701; 901/36, 37, 39, 41; 414/744.3, 786, 744.2, 744.4

[56] References Cited

U.S. PATENT DOCUMENTS

| 3,027,629 | 4/1962 | Wrightfield | 29/235 |
| 4,005,737 | 2/1977 | Mason | 29/235 |
| 4,190,943 | 3/1980 | Takahashi | 29/235 |
| 4,620,354 | 11/1986 | Hess et al. | 29/701 |
| 4,715,110 | 12/1987 | St. Angelo et al. | 29/450 X |
| 4,766,661 | 8/1988 | Croteau | 29/417 |

FOREIGN PATENT DOCUMENTS

| 0240968 | 4/1987 | European Pat. Off. |
| 2915282 | 4/1979 | Fed. Rep. of Germany |
| 2096757 | 5/1971 | France |
| 2520793 | 8/1983 | France | 29/564.8 |

*Primary Examiner*—William Briggs
*Attorney, Agent, or Firm*—Fidelman & Wolffe

[57] ABSTRACT

A machine for automatically fitting seals, in particular external seals to a groove in the opening frame of a window or French window, comprises a frame feed, referencing and measuring system. It further comprises a supporting gantry, a system for paying out the seal, a system for clamping the frame and a seal fitting and cutting device. This device comprises a framework, a gantry mobile in translation on this framework and a carriage mobile in translation on the gantry. The mobile carriage carries a manipulator head which rotates relative to the carriage and comprises a seal guide and drive system. A fixed part supports the cutting system. An arm articulated to the fixed part carries at its free end the seal fitting system. The machine further comprises a mechanism for feeding and removing the frames, preferably comprising two drive fingers mounted together to perform a synchronized to-and-fro movement. It finally comprises a frame clamping system mounted on the carriage and the manipulator head.

24 Claims, 16 Drawing Sheets

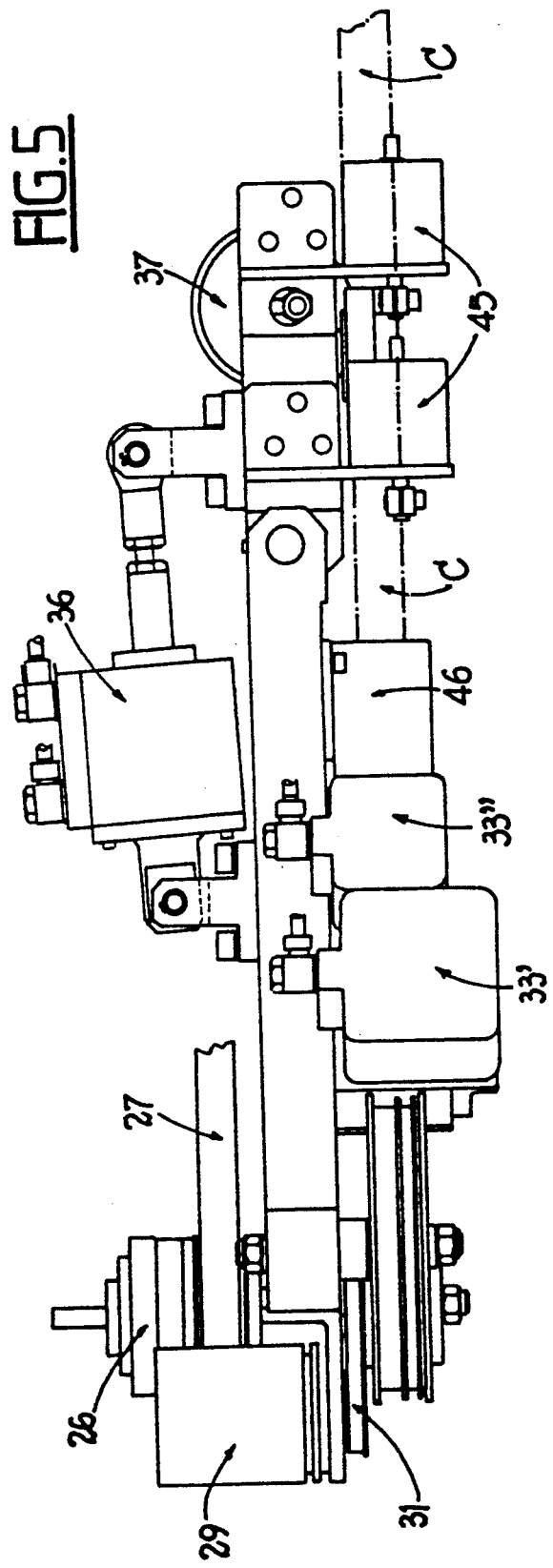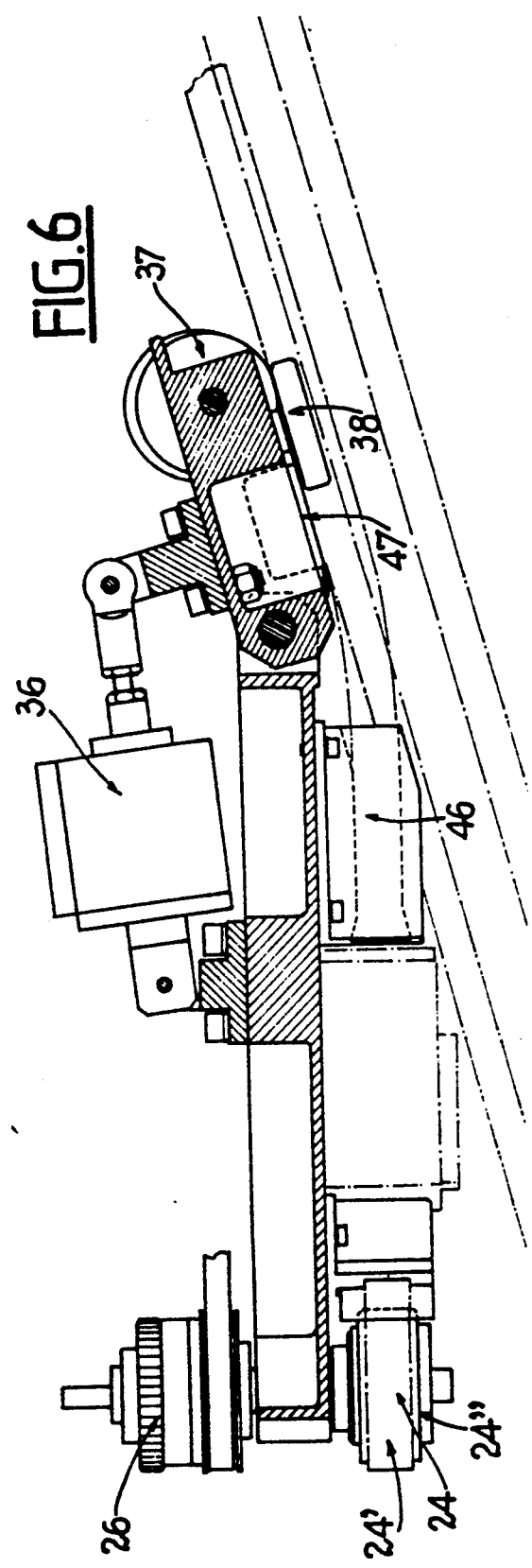

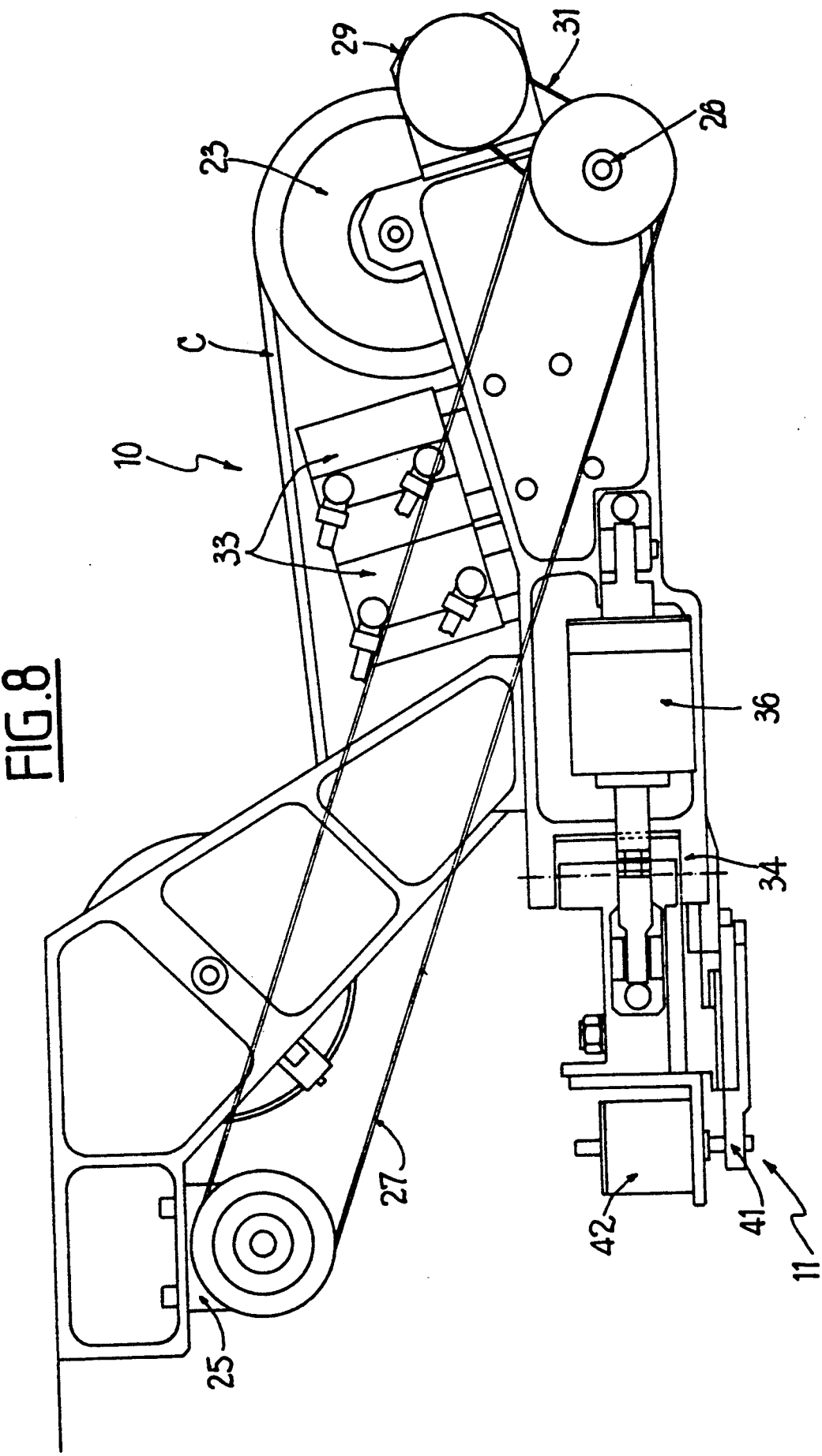

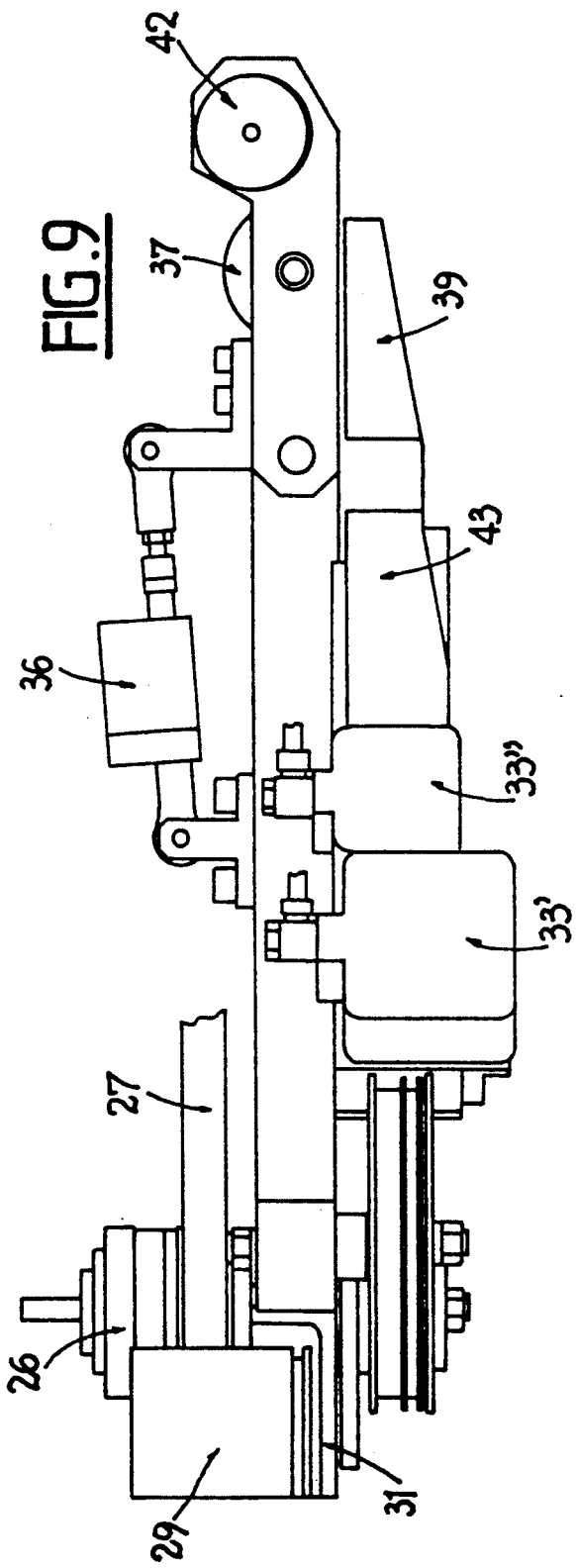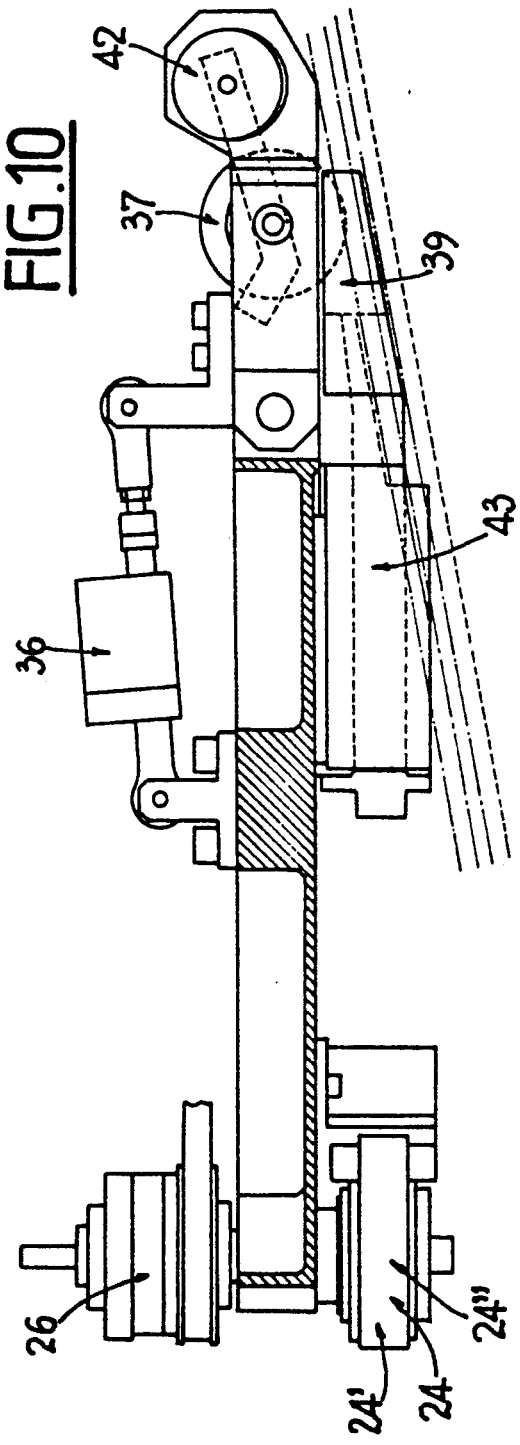

MACHINE FOR FITTING SEALS INTO A GROOVE

BACKGROUND OF THE INVENTION

1. Field of the invention

The invention concerns an automatic machine for fitting flexible seals, in particular for fitting an external seal into a groove in an opening frame of a window or French window. The machine comprises a loading table, a seal storage device and a device for fitting and cutting the seal.

2. Description of the Prior Art

An opening frame of a window or French window made from wood, plastics material, aluminum or the like usually comprises two horizontal crossmembers and vertical uprights forming a frame which receives on its external periphery fittings for articulating it to or supporting it on a fixed frame. This opening frame may comprise elements which overlap the fixed frame. The uprights and crossmembers incorporate internal shoulders adapted to receive the glazing unit or the like and external openings to receive various fittings. These fittings (espagnolette bolt components and the like) are fixed into openings in the external peripheral edge of the opening frame.

It is necessary to provide seals in openings between the fixed frame and the opening frame and between the glazing unit and the shoulders. If the glazing unit is in multiple parts it is also necessary to fit seals to the members which cover the edges of the glazed parts. These are beads and the like which fasten the glazing unit(s) to the opening frame.

In the conventional way the seal between the opening and fixed frames is fixed to the interior peripheral edge of the fixed frame. However, it is advisable to fit the seal as far as possible from the exterior plane of the fixed frame, which is the plane exposed to inclement weather, in order to obtain a so-called decompression chamber between the opening and closing frames. To avoid excessively imposing fixed frames and the need to groove them to fit the seal it became necessary to fit the seal onto the exterior peripheral edge of the opening frame. Window manufacturers are adopting this solution to an ever increasing extent as it produces windows offering better performance in bad weather while economizing in the raw materials from which the opening and fixed frames are made. This also makes it possible to use the same profile extrusions and like members.

The seal fitted to the exterior edge of the opening frame may be flexible or rigid, although it is never extruded in situ as is possible for the glazing unit seal can be. A rigid seal can be fitted manually without any particular difficulty, but requires preparation by cutting it to lengths corresponding to those of the frame. Although flexible seals have advantages in terms of their presentation, applying them manually raises significant problems: they tend to be applied slowly and in an irregular way because of the difficulty of inserting the seal into the groove. As a result, the labour portion of the overall unit cost is high.

In the present state of the art the opening frame to be fitted with seals is placed on a horizontal jig. This jig is provided with manual or automatic frame clamping means. If the jig is immobile and fixed to the ground it is necessary to leave sufficient room for an operator to fit the seal into the groove while moving around the frame, whether by hand or using appropriate tools; if it is not possible to move around the frame because of the adjoining workstations then two operators are needed to fit the seal, one on each side of the jig. If the jig is mobile on a support fixed to the ground then the amount of room required is reduced and one person can carry out the fitting in all cases; on the other hand, this type of installation requires a more complicated infrastructure and is more difficult to use. Seal fitters generally use a tool in the form of a manual roller or a kind of pneumatic chisel.

Also, the seal is not always paid out from a roll stored near the jig and it is sometimes precut, either by the supplier or at the point of use. This has the disadvantages of being extremely costly and of increasing the likelihood of errors occurring.

The precutting of seals has led to the development of automatic cutting machines. In addition to cutting seals to length, these machines can cut the corners. Previously the seal was cut to the length of the frame sides and was interrupted at the corners. Today the seal for an opening frame can be precut in one piece.

It is also noteworthy that standard practice in the industry called for the opening frames to be fitted out when complete. Nowadays it is very common for the crossmembers and the uprights to be fitted with their seals before they are assembled together. This makes it possible to achieve a higher degree of automation of the assembly line, it being possible to fit the seals linearly and semi-automatically. In this case the seal is discontinuous around the periphery of the assembled frame, however.

An object of the present invention is to remedy these disadvantages by proposing a machine comprising means for simultaneously cutting and fitting a flexible seal to an assembled frame, all of these operations being entirely automated irrespective of the parameters characterizing the frame (shape, length, cross-section of crossmembers and uprights, etc). It is particularly remarkable in that it combines at a single installation the fitting and the cutting of the seal, the type of frame at the workstation having been determined beforehand, after measuring its exact dimensions and transmitting these to the seal fitting carriage. The result is a significant increase in productivity and flexibility. It also makes the fitting of the seal into the groove in the frame more reliable and regular.

It is particularly intended to be integrated into a general frame finishing installation. It comprises a frame feed, referencing and measuring system, a gantry resting on the ground with a two-axis carriage, a seal fitting and cutting device and a system for paying out the seal from a spool. It enables the seal to be fitted automatically to three or four sides of the frame; feeding to the station, referencing, measuring and identification of the frames are automated.

SUMMARY OF THE INVENTION

The invention consists in a machine for automatically fitting seals, in particular external seals into a groove in a window or French window opening frame, comprising a frame feed, referencing and measuring system, a supporting gantry, a seal paying out system, a frame clamping system and a seal fitting and cutting device; the latter comprises a framework, a gantry mobile in translation on said framework and a carriage mobile in translation on said gantry; the mobile carriage carries a manipulator head which rotates relative to the carriage and comprises seal guide and drive means, seal cutting means and seal fitting means.

In a preferred embodiment the manipulator head has a fixed part supporting the cutting means and an arm articulated to the fixed part carrying at its free end the seal fitting means.

The fitting means preferably comprise a fitting member adapted to come into contact with the outside edge of the seal and to force it into the groove in the frame and a presser member adapted to press the seal in a direction perpendicular to the direction in which it is inserted into the groove in the vicinity of the edge of the frame.

Said fitting member is preferably a roller rotating about a substantially vertical axis on a spindle fastened to the arm.

In a first embodiment said presser member is a roller rotating about a substantially horizontal axis on a spindle fastened to the arm and in a second embodiment said presser member is a finger fixed to the arm.

These presser members are adapted to cooperate with the fitting member when the frame reaches the machine assembled but not equipped with any of its fittings.

In some cases it may be necessary to fit the external seal to a frame already equipped with fittings (espagnolette bolts, locks or the like) which may include locking members such as rollers or the like.

In this case the fitting members must enable the external seal to be fitted into the groove in the frame despite the obstacles that these fittings represent, the reference surface formed by the edge of the opening frame no longer being flat in the longitudinal direction. It is also essential for fitting to be continuous and automatic despite the existence of these obstacles.

To this end the present invention proposes a third embodiment of the presser member enabling continuous fitting of the seal despite protruding fittings, in particular locking components.

This presser member cooperates with the fitting roller; the fitting roller can remain in its operating position at all times as its level and thickness are such that it is never affected by the presence of the protruding fitting members.

On the other hand, in this embodiment the presser member comprises a mobile finger that can retract when it encounters a protruding fitting member; in this position the fitting roller alone operates on the seal to enable it to be inserted into the groove. Once the fitting member has been passed, a control member moves the presser finger towards the outside to return it to the operating position in which it presses against the seal.

This embodiment of the presser member therefore makes it possible to adapt the machine to the situation in which the external seal is to be fitted to a frame already equipped with fittings whose component parts, in particular locking components, protrude relative to the edge of the frame. Of course, the machine equipped with this presser finger may also be used on frames that are not equipped with fittings.

If the location of the protruding components is known precisely the member controlling the presser finger is operated in accordance with parameters corresponding to the known locations of the protruding components.

If the location of the protruding components is not known precisely, the mobile presser finger strikes a protruding component during movement of the fitting head the component concerned pushes it down into the retracted position; after a protruding component has passed by the mobile presser finger is returned to the active position in which it presses against the seal.

The machine in accordance with the invention also has a special-purpose feed and removal mechanism.

The combination of an edge and at least one drive finger provides for accurate positioning of the frame on the loading table.

In the preferred embodiment of the invention the feed and removal mechanism comprises two drive fingers mounted together to perform a synchronised to-and-fro movement.

The second finger feeds a frame to be fitted with seals while the first frame is removing the previous frame fitted with seals; then the second finger removes the frame fitted with seals; then, by a movement in the opposite direction, the first finger feeds another frame to be fitted with seals while the second finger is in a waiting position. This speeds up the feeding and removal of frames.

Automatic drive fingers are used to position the frame on the jig from the loading table. To do this through a transfer plane downstream of the machine constituted by a brush type belt, for example, these drive fingers move the frame along an edge fastened to the loading table. Thereafter wedging and holding means are used, comprising clamping forks mounted on belts driven by two motors. These two clamping forks constitute two mutually perpendicular movements with effects opposite to the drive fingers.

Given the forces generated by the clamping forks, which are driven and supported by the of one or more bottom horizontal beams in the framework of the machine, the clamping system can raise certain problems.

Given the inertia of the beams, the clamping forces are transmitted to the frame and may distort it. These distortions can be internal, that is to say, particularly at the locations of the corner joints between the uprights and the crossmembers of the clamped frame. They may also be general, in other words, the frame structure may be distorted, for example, raised at one or more corners.

The present invention also proposes ways to overcome these problems.

To this end opening frame bearing and clamping means are provided on the carriage.

In more precise terms, a vertical bearing mobile member is provided on the fixed part of the manipulator head to keep the frame flat by pressing on its upper surface; a single-point bearing member is provided on the carriage.

The mobile first member exerts virtually continuous pressure on the upper surface of the opening frame to ensure that it is kept flat, the clamping as described above being insufficient to achieve this on its own.

At the corners of the opening frame, where the clamping fork system is unable to keep the frame flat, the first member must be retracted to enable rotation of the manipulator head. This is why the second, single-point bearing member is provided. As soon as the mobile first member is retracted the second member bears on the upper surface of the frame while enabling rotation of the manipulator head by one quarter-turn.

In a preferred embodiment the mobile member comprises a roller rotating about a substantially horizontal axis.

The single-point bearing member is preferably a vertical piston-and-cylinder actuator whose piston rod carries a bearing skid at the end.

The machine is designed to fit seals automatically to a window or French window opening frame. It is therefore necessary to determine whether the opening frame is for a window or a French window when it is fed to the loading table.

To this end the machine in accordance with the invention comprises a very simple improvement whereby recognition means are disposed on the loading table in such a way as to be activated when a French window opening frame is placed on it.

To this end the loading table is fitted with French window opening frame sensing means.

These means are preferably levers projecting from the loading table adapted to be folded down by lateral pressure and operate a contactor.

The invention will now be described in more detail and by way of non-limiting example only with reference to the accompanying diagrammatic drawings.

BRIEF DESCRIPTION OF THE DRAWINGS

FIG. 5 is a partial plan view of the manipulator head in this first embodiment.

FIG. 6 is a view of the manipulator head in this first embodiment in cross-section on the line A—A.

FIG. 8 is a view of the other side of the manipulator head in this second embodiment.

FIG. 9 is a partial plan view of the manipulator head in this second embodiment.

FIG. 10 is a view of the manipulator head in this second embodiment in cross-section on the line A—A.

DETAILED DESCRIPTION OF THE INVENTION

Figure 1:
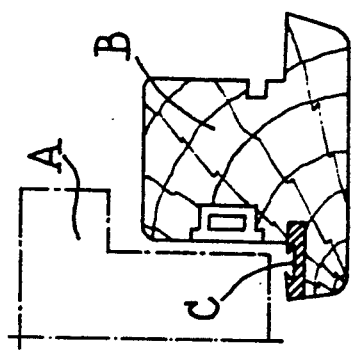
FIG. 1 is a partial view in cross-section of a fixed frame and an opening frame fitted with an external seal.

As can be seen in FIG. 1, the opening frame B is provided on the side facing towards the fixed frame A with a groove into which is inserted the external seal C to which the remainder of this description refers.

Figure 2:
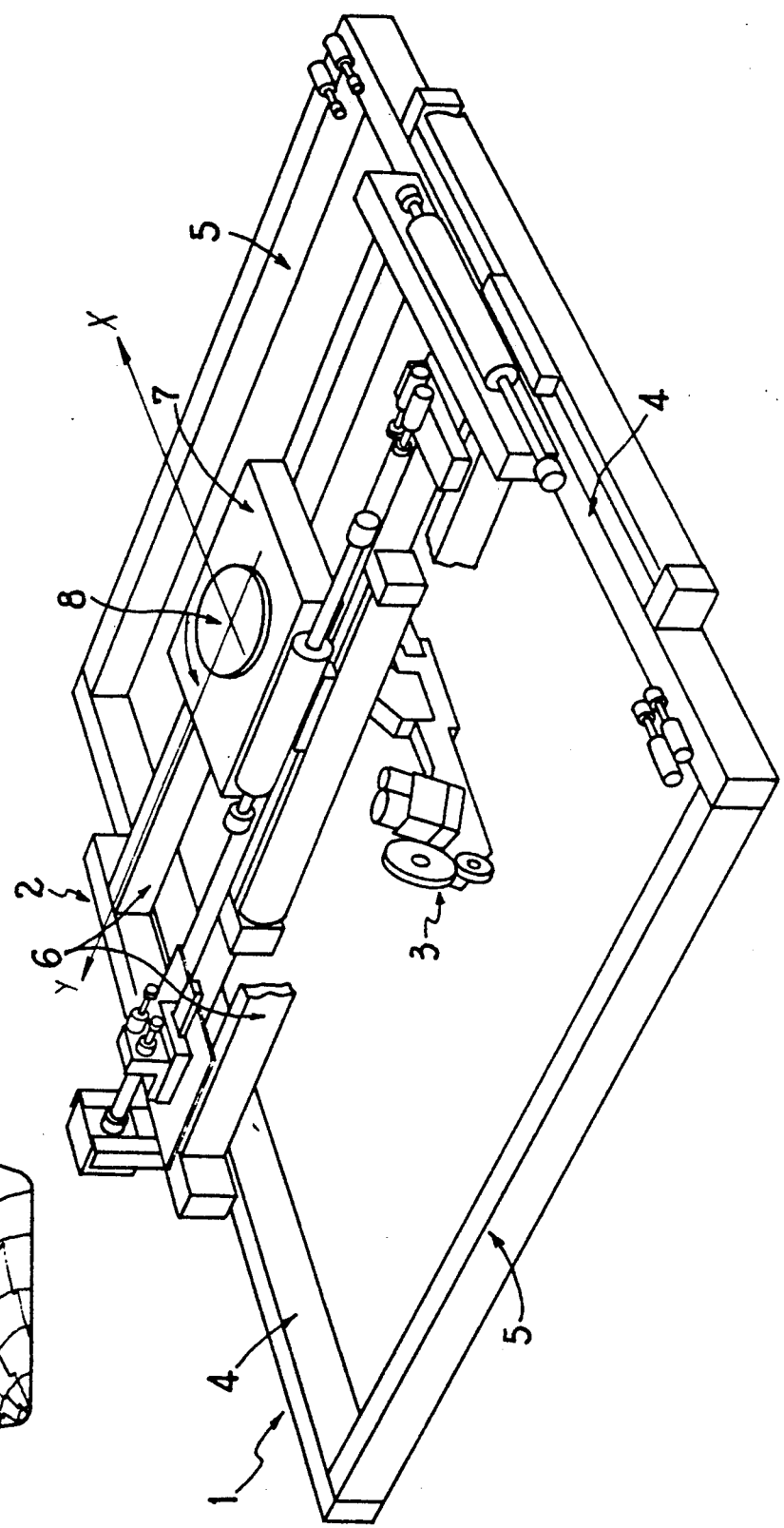
FIG. 2 is a general perspective view of a device for fitting and cutting the seal.

As shown in FIG. 2, the seal fitting and cutting device comprises a framework 1 spanned by a gantry 2. In a way that is known in itself, the gantry 2 moves a manipulator head 3 along two axes. To this end the framework 1 is a fixed framework attached to the ground and comprises in its upper part two parallel longitudinal rails 4 providing a rollway and constituting the X displacement axis of the gantry 2, which moves on the rails of the framework on ballbearing rollers. The gantry is attached by clamps to parallel notched belts running along the rails and driven by two pulley wheels mounted on a shaft whose bearings are fixed to a crossmember 5 of the framework 1 and which are rotated by a variable speed DC motor-gearbox unit and encoder to move the gantry. Two idler pulley wheels on the opposite crossmember of the framework are used to adjust the tension of these belts.

These known means for controlling the displacement and speed of the gantry 2 can, of course, be replaced by other means, pneumatic or like means, for example, procuring the same results.

The gantry 2 in turn comprises two parallel rails 6 perpendicular to the direction in which it moves and in particular perpendicular to the two rails 4 on the framework 1. The two rails 6 constitute the Y displacement axis of a carriage 7 carrying the manipulator head 3. In a similar way to the gantry 2 on the rails 4 on the framework 1, the carriage 7 is attached by clamps to belts parallel to the rails on the gantry 2. These belts are driven by pulley wheels. A motor-gearbox unit fixed to the gantry drives these belts the displacement and speed of which are controlled by means of encoders and variable speed drives.

The framework 1 and the gantry 2 together with the means for displacing them are known in themselves. The combined X and Y displacements pay out the seal.

The framework and the gantry are equipped with means for automatically fitting and cutting the seal, as will now be described in more detail, At the center of the carriage 7 is a vertical shaft 8 rotated by a vertical axis motor-gearbox unit and drive belt. The seal fitting or manipulator head 3 is attached to the lower end of the vertical shaft 8 which is hollow so that the cables or hoses supplying the fitting head and its accessories and the seal can pass through it. The shaft 8 rotates between four fixed positions at 90° to each other corresponding to the four sides of the window frame. The rotation is limited to 360° with a return to the central position each time the frame is changed to minimize twisting of the cables, hoses and seal passing through the shaft. Of course, this mode of operation is in no way limiting since the position of the shaft can be programmed for equipping frames of various parallelepiped shape or even frames that are circular or any other shape.

The manipulator head 3 is screwed or otherwise fixed to the wall of the shaft 8 and is located under the carriage 7 on the gantry 2. It will now be described in more detail with reference to FIGS. 3 through 20.

The manipulator head 3 comprises a fixed part 10 supporting the unit for supplying and cutting the seal and an arm 11 articulated to the fixed part 10 and supporting the seal fitting units. The fixed part 10 is a light alloy or similar material support in two parts 10' and 10''. The upper part of the first part 10' supports an idler pulley wheel 21 which guides the seal C fed vertically through the hollow rotating shaft 8 of the carriage; the idler pulley wheel 21 comprises a guide 22 fastened to the spindle of the pulley wheel 21 and to the fixed part of the fitting head and securing the seal C to the pulley wheel; at one end the second part 10'' of the fixed part supports a direction-changer pulley wheel 23 mounted on an eccentric spindle for adjusting how hard the seal C is pressed onto a resilient drive roller 24; the roller 24 comprises a resilient tire 24' clamped between two metal flanges 24'' and mounted on the drive shaft by means of taper-roller bearings.

Figure 3:
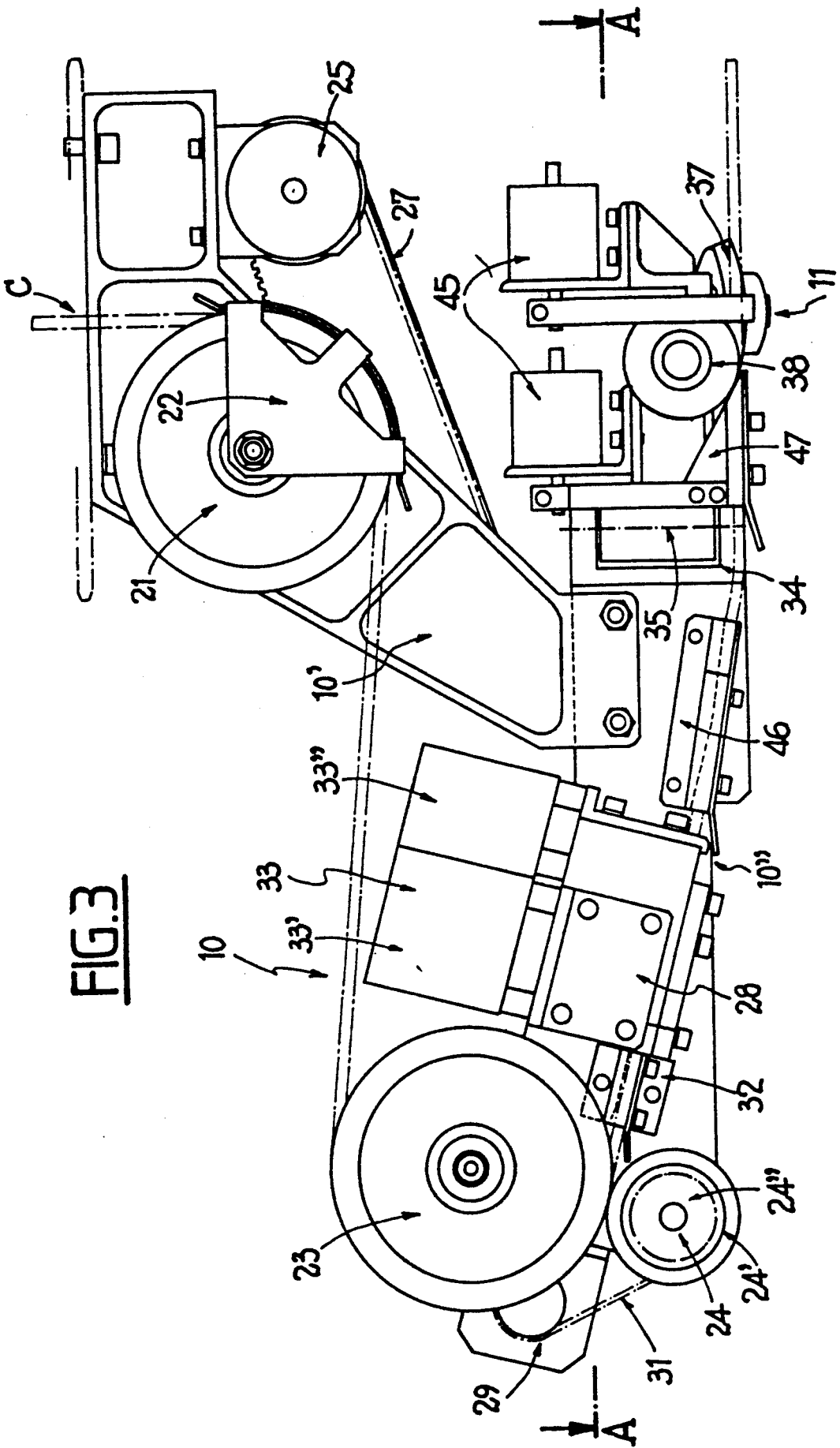
FIG. 3 is a side view of a manipulator head in a first embodiment.
Figure 4:
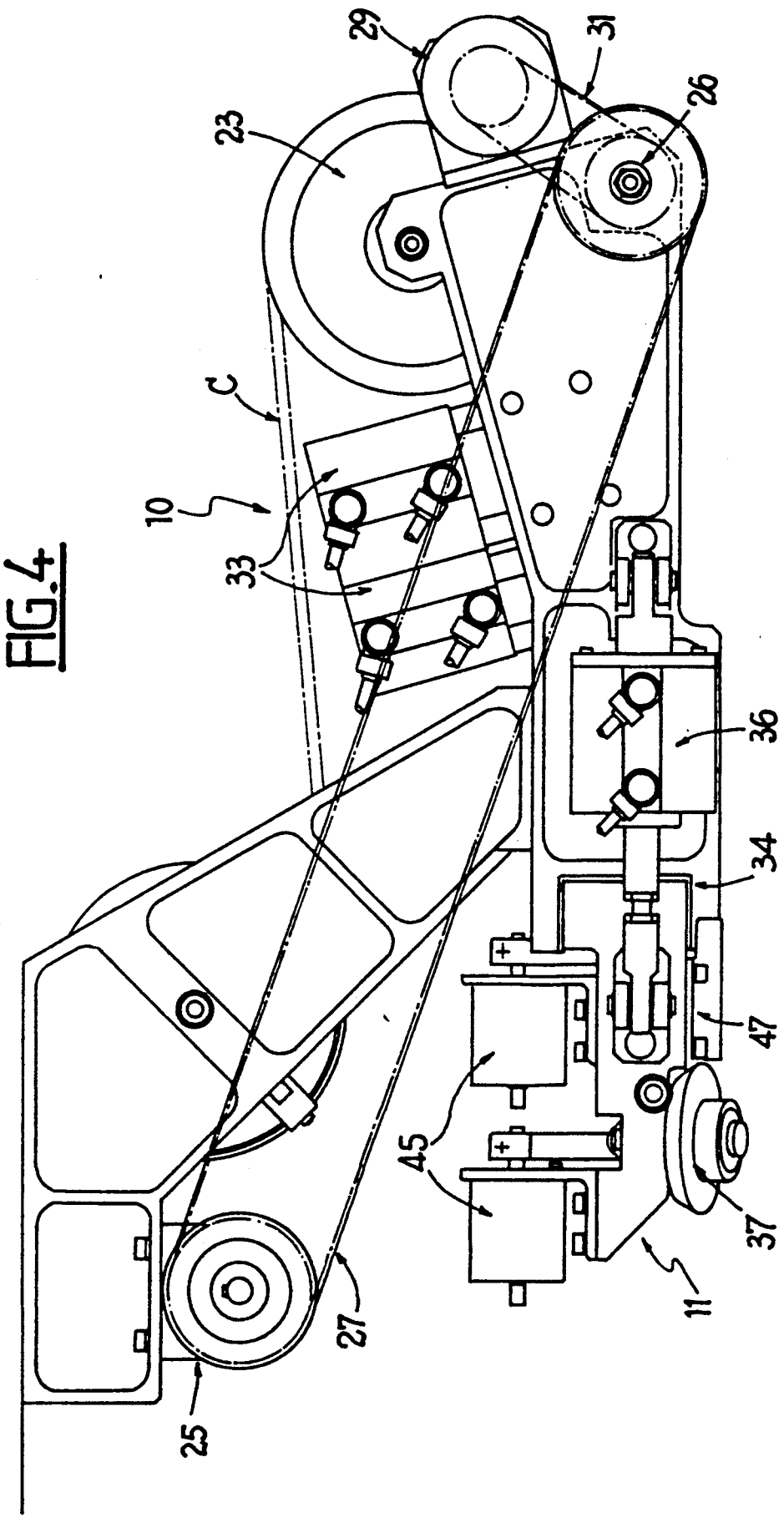
FIG. 4 is a view showing the other side of the manipulator head in this first embodiment.
Figure 7:
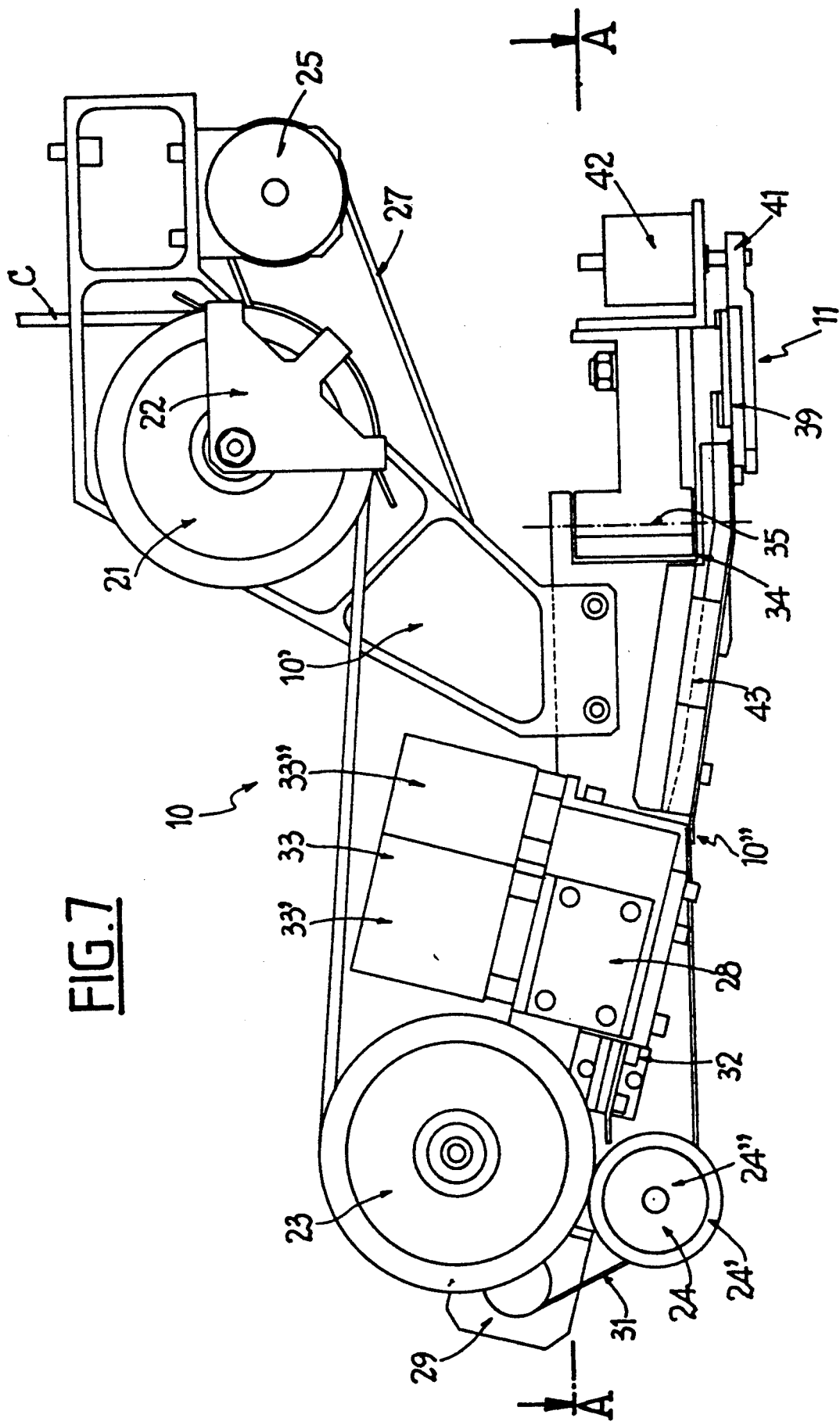
FIG. 7 is a side view of the manipulator head in a second embodiment.
Figure 11:
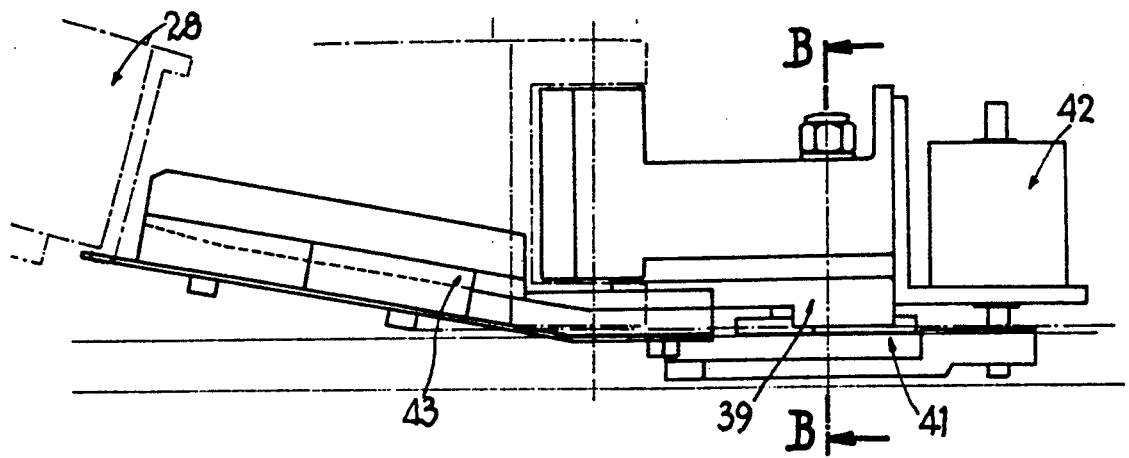
FIG. 11 is a partial side view of the manipulator head in this second embodiment.

A variable speed motor 25 suspended under the fixed part 10 drives an adjustable torque limiter 26 mounted on the other end of the spindle of the drive roller 24 through a notched belt 27; the magnetic torque limiter 26 allows variations between the speed of the motor 25 and the rate of advance of the seal C, by virtue of variable slipping, the seal C being immobilized during the downward movement of the cutter blade of a cutting unit 28 or accidentally; the movement of the roller 24 and consequently the advance of the seal C are controlled by an actuator 29 fastened to the fixed part 10; the actuator 29 is coupled by a notched belt 31 to a pulley wheel fastened to the spindle of the drive roller 24, as can be seen in FIGS. 3 and 4.

At the point where the seal leaves the drive roller 24 continuity of guidance is ensured by a tunnel-like guide device 32 as far as the cutter unit 28 which comprises two cutting blades of which one cuts the seal to suit the corners of the frame and the other cuts it straight at the beginning and end of the fitting process. The blades are operated by double-acting piston-and-cylinder actuators; the cutter unit 28 therefore comprises double-acting piston-and-cylinder actuators 33 respectively actuating one blade 33' for the corner cuts and one blade 33'' for the straight cuts.

At the other end of the second part 10'' of the fixed part 10 is a yoke 34 supporting by means of a vertical shaft 35 the articulated arm 11 which fits the seal C into the groove in the frame.

Figure 16:
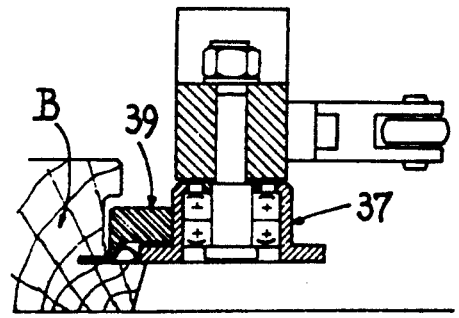
FIG. 16 is a view in cross-section on the line B—B of fitting means operating on an opening frame external seal in the second embodiment.

The arm 11 carries a roller 37 whose rotation axis is substantially vertical and which comes into contact with the outside edge of the seal C above its fitting plane and forces the stub end of the seal C into the groove in the opening frame (FIG. 16).

The mobile arm 11 is moved by a double-acting pneumatic piston-and-cylinder actuator 36 fixed at one end to the fixed part 10 and at the other end to the mobile arm 11; when the piston rod of the actuator 36 is retracted the mobile arm 11 is drawn away from the frame and the fitting roller 37 is no longer in contact with the seal; when the piston rod of the actuator 36 is deployed the mobile arm 11 moves towards the opening frame and the fitting roller 37 pushes the seal into the groove with a force that varies according to the pressure fed to the actuator 36. At the mid-travel position the arm 11 is aligned with the fixed part 10 and the fitting roller 37 is tangential to the external edges of the opening frame; this is the "0" position before the fitting of the seal actually begins; this position is variable to compensate for manufacturing deficiencies and inaccuracies in positioning the frame; the actuator 36 behaves like a pneumatic spring bearing against the fitting roller 37.

It goes without saying that the means of controlling the mobile arm 11 is not limited to this preferred embodiment.

A presser unit 38, 39 cooperates with the roller 37 to insert the seal C into the groove in the opening frame. It is designed to press on the seal in a direction perpendicular to the direction it is inserted into the groove.

In a first embodiment the presser unit is a presser roller 38 which rotates on a horizontal spindle fastened to the mobile arm 11 (see FIGS. 3 through 6). In this case guide tunnels 46 and 47 are provided at the outlet from the cutter unit 28 on the mobile arm 11, the one which is further downstream in relation to the direction of movement of the seal 47 serving also as a guide, in a similar way to the guide 43 to be described later.

In a second embodiment the presser unit is a finger 39 fixed to the end of the guide 43 as shown in FIGS. 7 through 16. As seen in FIG. 16 in particular, this finger comprises a downwardly projecting part which bears on the stub end of the seal between the back of the groove and the bead on the seal.

Figure 12:
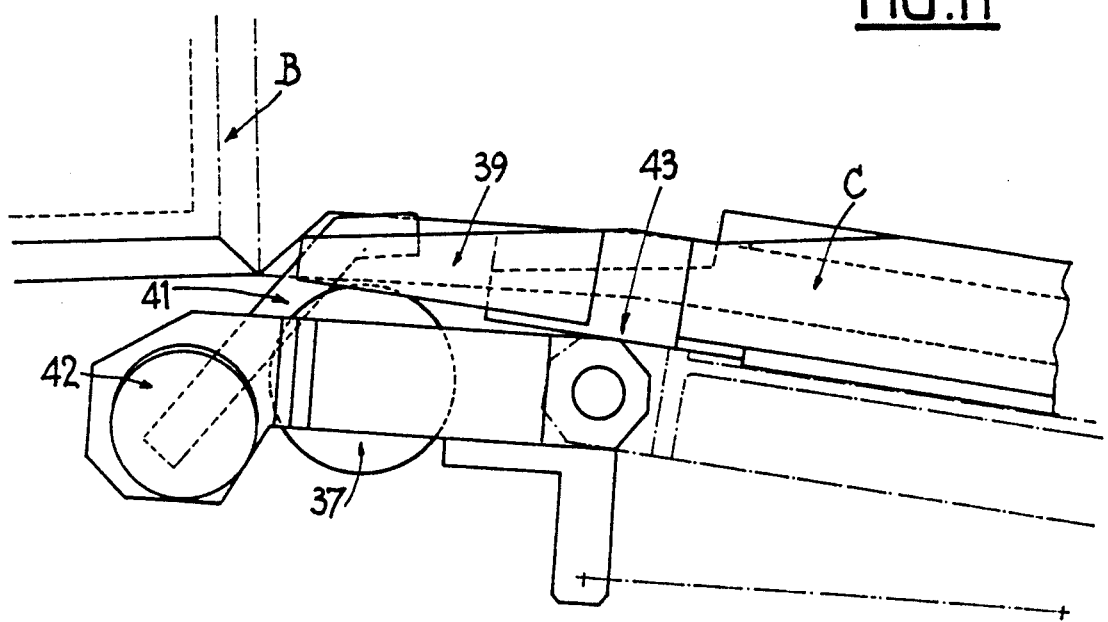
FIGS. 12 through 14 are partial plan views of the manipulator head in this second embodiment in operation and respectively: before rotation through an angle, at the beginning of seal fitting and in the middle of seal fitting.
Figure 13:
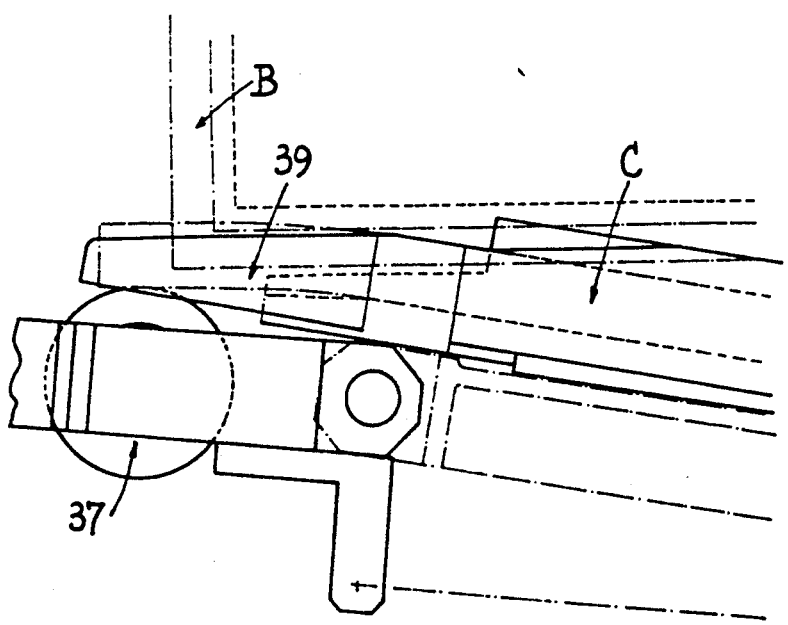
Figure 14:
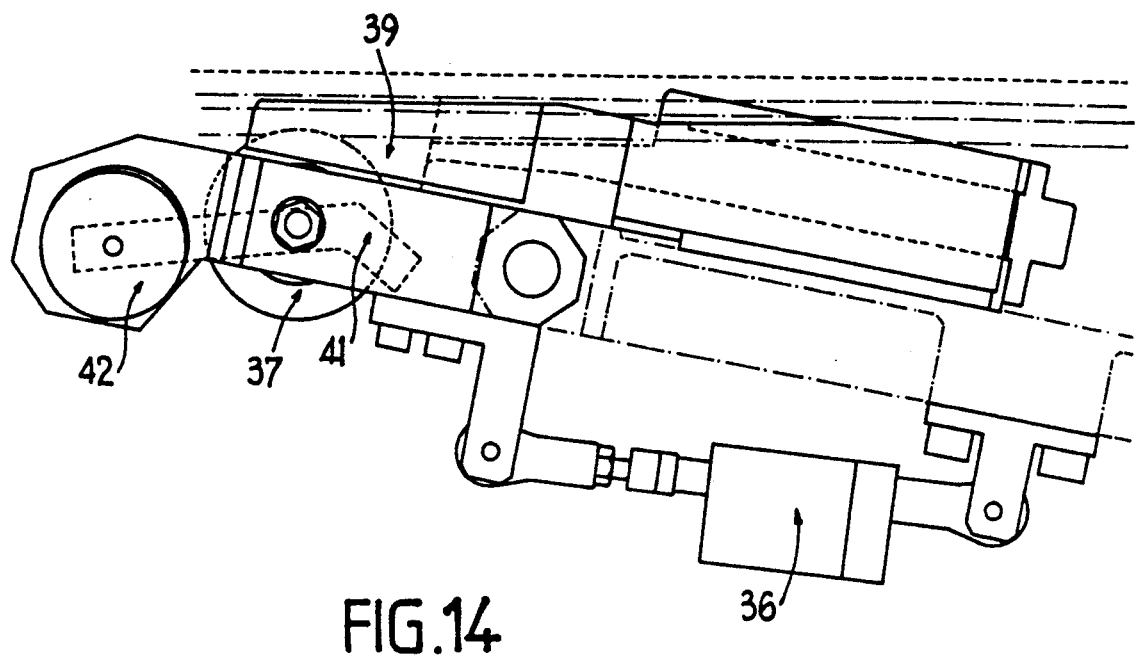
Figure 15:
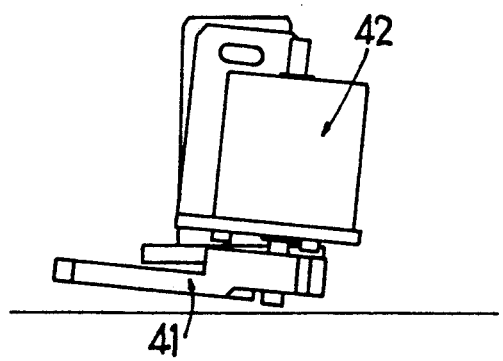
FIG. 15 is a partial front view of the manipulator head.

In this latter case a finger 41 is mounted at the end of the articulated arm 11 on the spindle of a rotary actuator 42 inclined to the vertical (FIG. 15). The finger 41 is used at each corner of the window to support the part of the seal C which at this time is on the outside of the opening frame, during rotation of the manipulator head 3 (FIG. 12). This is before the rotary shaft 8 of the carriage 7 rotates. The inclination of the axis of the actuator 42 (FIG. 15) is fixed and causes the finger 41 to move in a plane that is not parallel to the fitting plane so that it raises the seal C above the latter plane during the aforementioned rotation and so prevents wedging of the seal C between the frame and the fitting roller 37 at the end of the rotation. Just like the mobile arm 11 articulation actuator 36, the rotary actuator 42 of the mobile finger 41 serves as a spring, for example when the finger is in abutting relationship with the groove in the frame, to compensate for any shortcomings.

A guide 43 is provided at the outlet from the cutter unit 28 to position the seal C correctly at the outlet from the cutter unit 28 and as far as the fitting roller 27. Its end above the mobile finger 41 during rotation of the fitting head 3 at the corner of the opening frame secures the seal C effectively and cantilever-fashion during this rotation. It also enables correct displacement of the seal C on the fitting plane and correct placing of the stub end of the seal in line with the groove in the frame.

Actuators 45 (FIGS. 3 through 6) or the actuator 29 (FIGS. 7 through 9) are provided to enable fitting to start at a corner of the frame or at a predetermined distance from a corner on the crossmember or upright of the frame. The latter case is easier and more often encountered in practice since there is then a straight cut in the seal on starting and on ending the fitting process and between these four corner cuts carried out in a predetermined way based on automatic capture of the frame characteristics. On the other hand, the first case where fitting begins at a corner entails a slantwise cut in the seal to start fitting at the corner followed by three corner cuts and ending with a slantwise cut in the opposite direction to the initial cut; these slantwise cuts are made by the angular cutter unit and the straight cutter unit after parametering the offset equal to a distance between the centerline and the cuts. In the latter case it is also possible to fit seals to only three sides of a frame for specific conditions; the start and end cuts then remain straight and only two corner cuts are needed.

These possibilities are in no way limited to rectangular frames as all the parameters can be monitored automatically and all functions coordinated by means of encoders.

The third embodiment of the presser unit will now be described with reference to FIGS. 17 through 20, this embodiment being specifically designed for handling opening frames already equipped with metal fittings.

Figure 17:
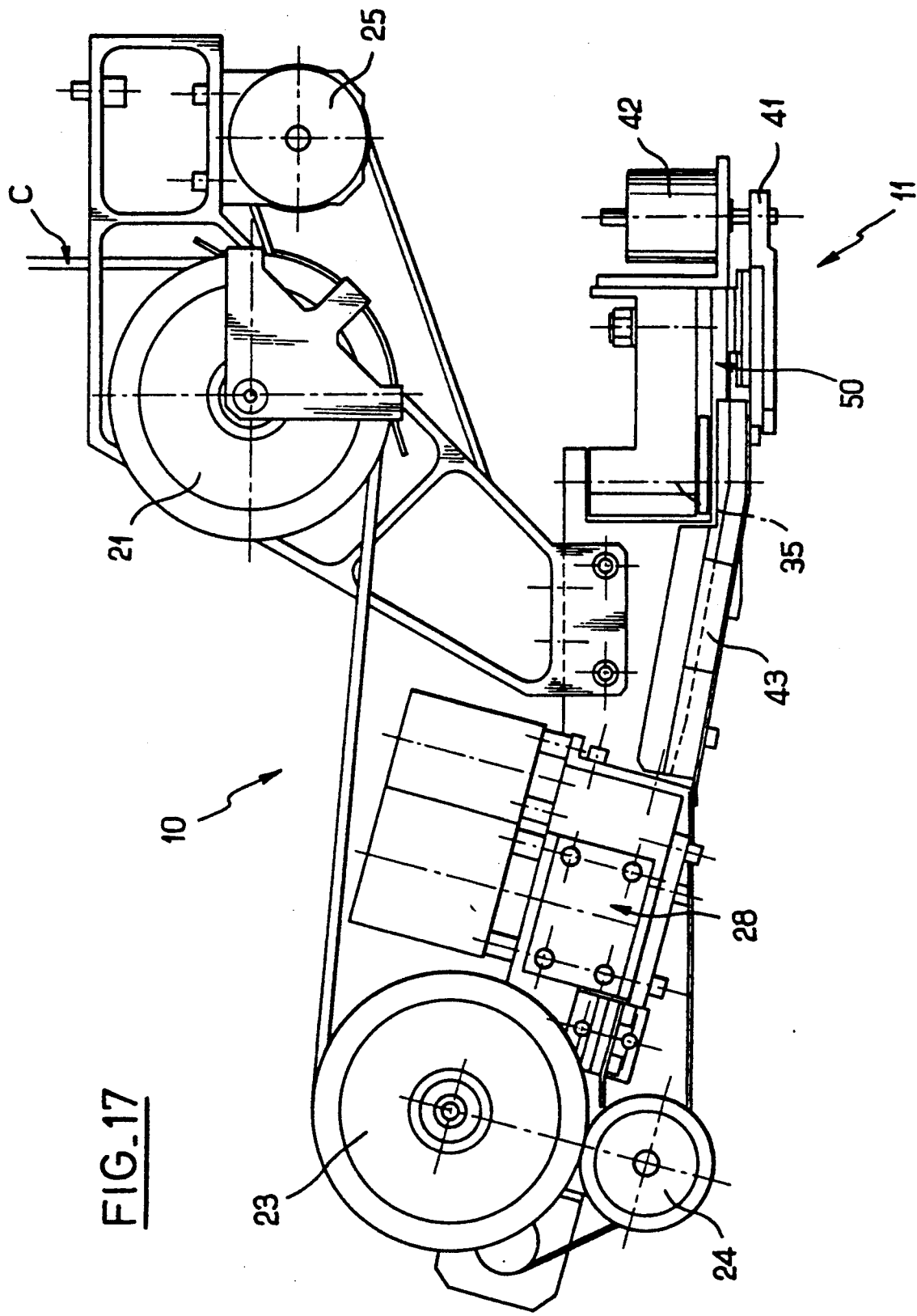
FIG. 17 is a side view of the manipulator head in a third embodiment of the pressing unit.

As can be seen in FIG. 17, a mobile finger 41 is mounted at the free end of the mobile part 11 of the manipulator arm. This finger is fastened to a rotary actuator 42 inclined to the vertical and is adapted to support the seal outside the frame when the head rotates at each corner.

Finally, a guide 43 is situated near the articulation of the mobile arm 11, its position and shape serving to position the seal in the groove in the frame.

Figure 23:
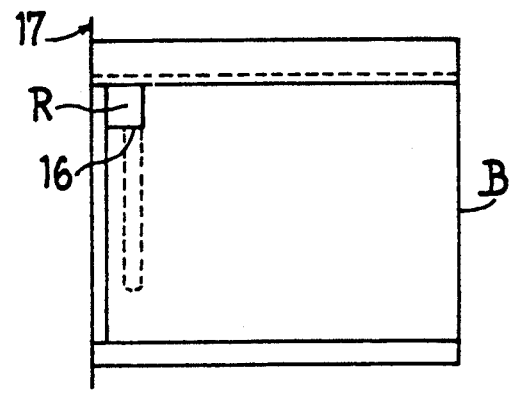
Figure 24:
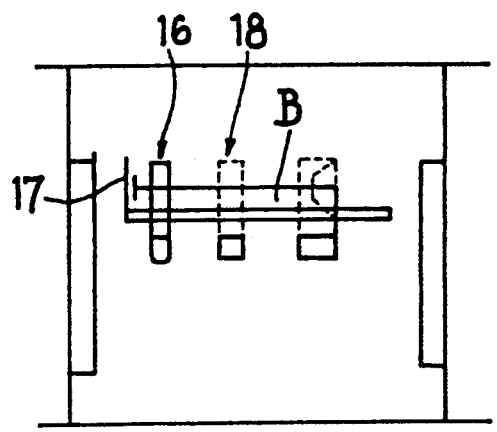
FIGS. 24 and 25 are respectively front and plan views of the locking and holding mechanism in the working plane.
Figure 25:
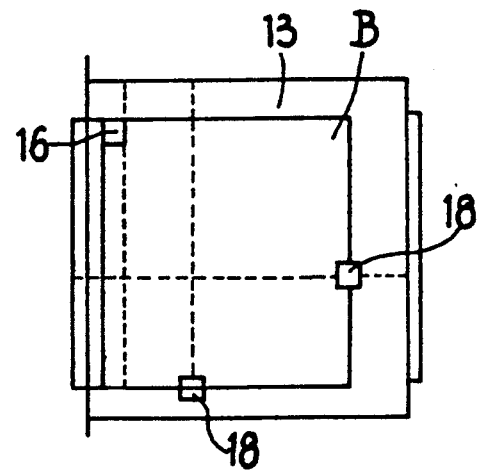

The mobile presser finger 50 will now be described in detail with reference to FIGS. 23 through 25.

Figure 18:
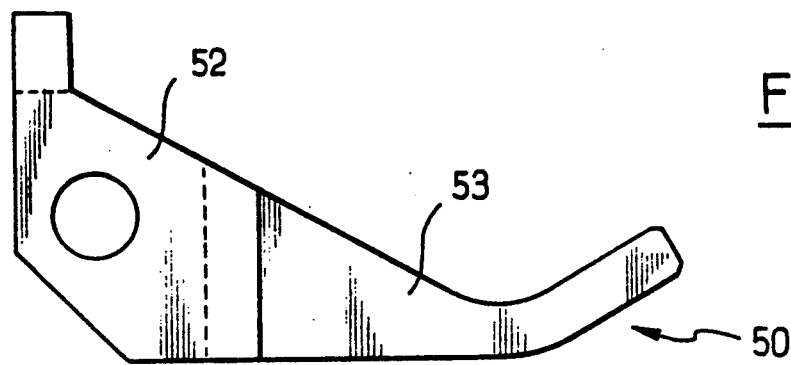
FIG. 18 is a plan view of the pressing finger in this third embodiment of the pressing unit.
Figure 19:
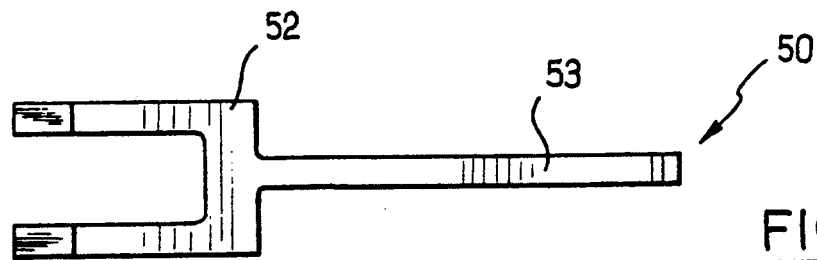
FIG. 19 is a side view of the pressing finger in this third embodiment of the pressing unit.

As can be seen in FIGS. 18 and 19, it essentially comprises a yoke-shape part 52 and a presser part 53. The latter part 53 is shaped to press on the stub end of the seal between the back of the groove and the bead on the seal.

Figure 20:
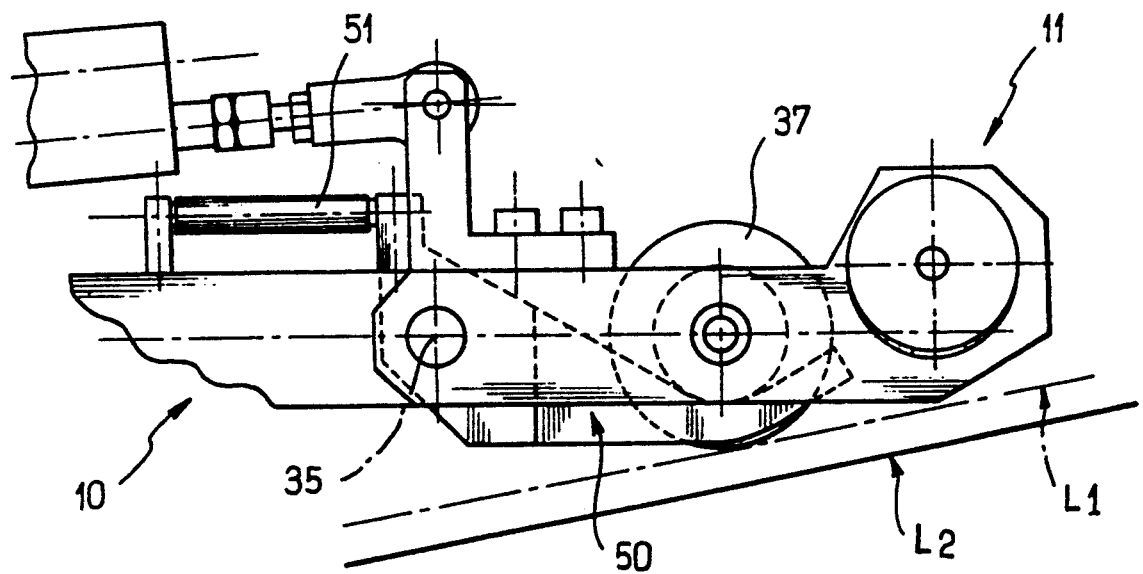
FIG. 20 is a partial plan view of the manipulator head in this third embodiment showing the pressing finger in its retracted position.
Figure 21:
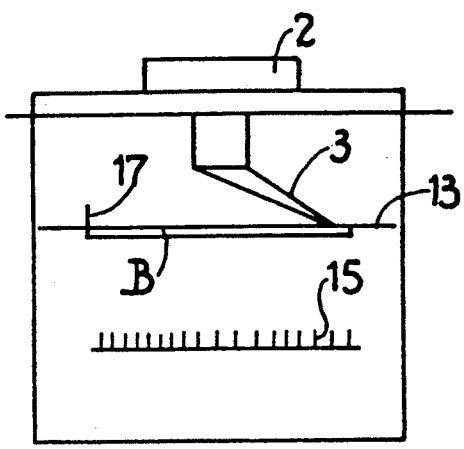
FIG. 21 is a schematic representation of the entire machine.
Figure 22:
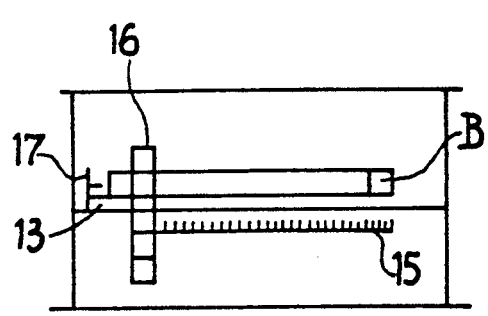
FIGS. 22 and 23 are respectively front and top views of the positioning mechanism in the plane of movement.

As can be seen in FIG. 20, in its retracted position the presser finger presses against the upper part of the fitting roller 37, the diameter of which is less than that of the active part of the roller 37.

The presser finger pivots on the pivot spindle 35 of the mobile part 11 of the manipulator head. The finger 50 is operated by the actuator 51 mounted on the fixed part 10 of the manipulator arm and on the upper branch of the yoke part 52 of the finger 50.

In its retracted position the finger 50 therefore occupies the position shown in FIG. 20 and in the active (pressing) position it is pivoted outwards so that its end rests vertically against the back of the groove as schematically represented by the line L2. The fitting roller 37 remains in the active position at all times,. in contact with the outer edge of the seal C as schematically represented by the line L1.

What is more, the finger 50 cooperates with the mobile finger 41 at each corner to support the part of the seal C, which at this time is outside the frame, when the manipulator head rotates. Although the inclined axis of the actuator 42 causes the finger 41 to move in a plane that is not parallel to the fitting plane, the finger 50 retains the seal C in a horizontal position, parallel to the general plane of the frame, so preventing it from becoming twisted near its corner part, which may be cut slantwise.

The complete seal fitting machine in accordance with the invention will now be described with reference to FIGS. 21 through 25. It comprises:
   a frame feed, referencing and measurement mechanism,
   a gantry resting on the ground,
   the fitting and cutting device already described, and
   a system for paying out the seal from a spool.

The means for supplying the frames and the means for offloading them to other work units are conventional elements such as conveyor belts, etc. These supply means and the loading table 13 or jig are on a plane parallel to the plane of the gantry 2. The direction of movement of the products will be the same as the direction of movement of this gantry.

The frame feed, referencing and measurement mechanism will now be described in more detail.

It is in the form of a conveyor belt provided with at least one frame drive finger; a loading table or lifting device 13 takes up each frame at the station and displaces it to a vertical reference position.

At least one automatic drive finger is used to move the frame B onto the jig from the loading table 13. To this end a drive finger 16 operates through a transfer plane downstream of the machine and consisting in the example shown of a brush type belt 15, for example. This finger moves the frame B along an edge 17 fastened to the loading table. The combination of this edge and the drive finger advantageously avoids skewing of the frame on the loading table 13 during its positioning.

In operation the brush belt 15 feeds the frame B in front of the loading table 13. An automatic system operates the control finger 16 which is positioned inside the frame B at one of its internal corners. This reference corner R is always that on the upstream side relative to the direction of movement and situated near the edge 17 of the loading table so that the drive finger 16, fitting into this corner, applies one side of the frame to the edge 17 of the loading table 13 and will convey the frame 14 with the brush belt 15 along the latter. An automatic system will stop this movement at a theoretical stop plane that is the same for all types of frame. The reference corner R corresponds to the virtual corner formed by the edge 17 and this stop plane. This initial position makes it possible to use wedging and holding means which in conjunction with encoders will determine the characteristics of the frame. Note that at this stage the frame B is positioned on means for raising the jig into a so-called working plane, which is also predetermined. These lifting means are those of the loading table 13. They do not operate until the wedging and holding means have been operated.

The wedging and holding means are clamping forks mounted on belts driven by two motors. The belt is fitted with contact devices which clamp the frame B to the loading table 13 relative to the reference corner R or relative to the edge 17 and the stop plane. The two clamping forks 18 constitute X and Y axis movements with opposite effects to the drive finger 16. In the case of large frames the fork type clamp advantageously eliminates warping of the frame on the loading table 13.

The cycle start position is achieved by moving the loading table 13 from the movement plane into the working plane by conventional means such as piston-and-cylinder actuators or the like. When the seal fitting cycle ends the fitting head 3 is removed by its actuator and the loading table 13 is returned to the plane of the feed means. After retraction of the clamping forks 18 and the drive finger 16 the belt 15 moves the frame B fitted with its seal to another work unit. At the same time another frame arrives at the loading table 13 from its upstream side.

In the preferred embodiment of the invention the feed and offtake mechanism comprises two drive fingers mounted together to perform a synchronized to-and-fro movement.

The second finger feeds a frame to be fitted with seals while the first is removing the previous frame already fitted with seals; the second finger then removes the equipped frame; then, by a movement in the opposite direction, the first finger feeds another frame to be fitted with seals, while the second finger is in a waiting position. This speeds up the feeding and removal of frames.

The fitting and cutting device is mounted on a gantry resting on the ground. This gantry is a welded structure and supports the rails which guide the gantry 2, the travel of which is 2.5 meters, for example, being moved by the drive system already described; the carriage 7 might have a travel of approximately 1 meter, for example. The gantry standing on the ground carries the frame feed and referencing mechanism.

Finally, the system for paying out the seal is a support for a spool of seal mounted alongside the installation or on the side of the framework of the installation. It is fitted with a brake to prevent the spool running away during paying out. An end of spool sensor tells the operator when to change the spool. In another embodiment only seal guides are disposed in the vicinity of the automatic fitting and cutting device. Note that the X-axis movement of the gantry 2 is used to pay out the seal, one end of which is held by the manipulator head 3.

The carriage is directly equipped with frame clamping and bearing means. These comprise a mobile bearing member fitted to the manipulator head and a single-point bearing member supported directly on the carriage.

Figure 26:
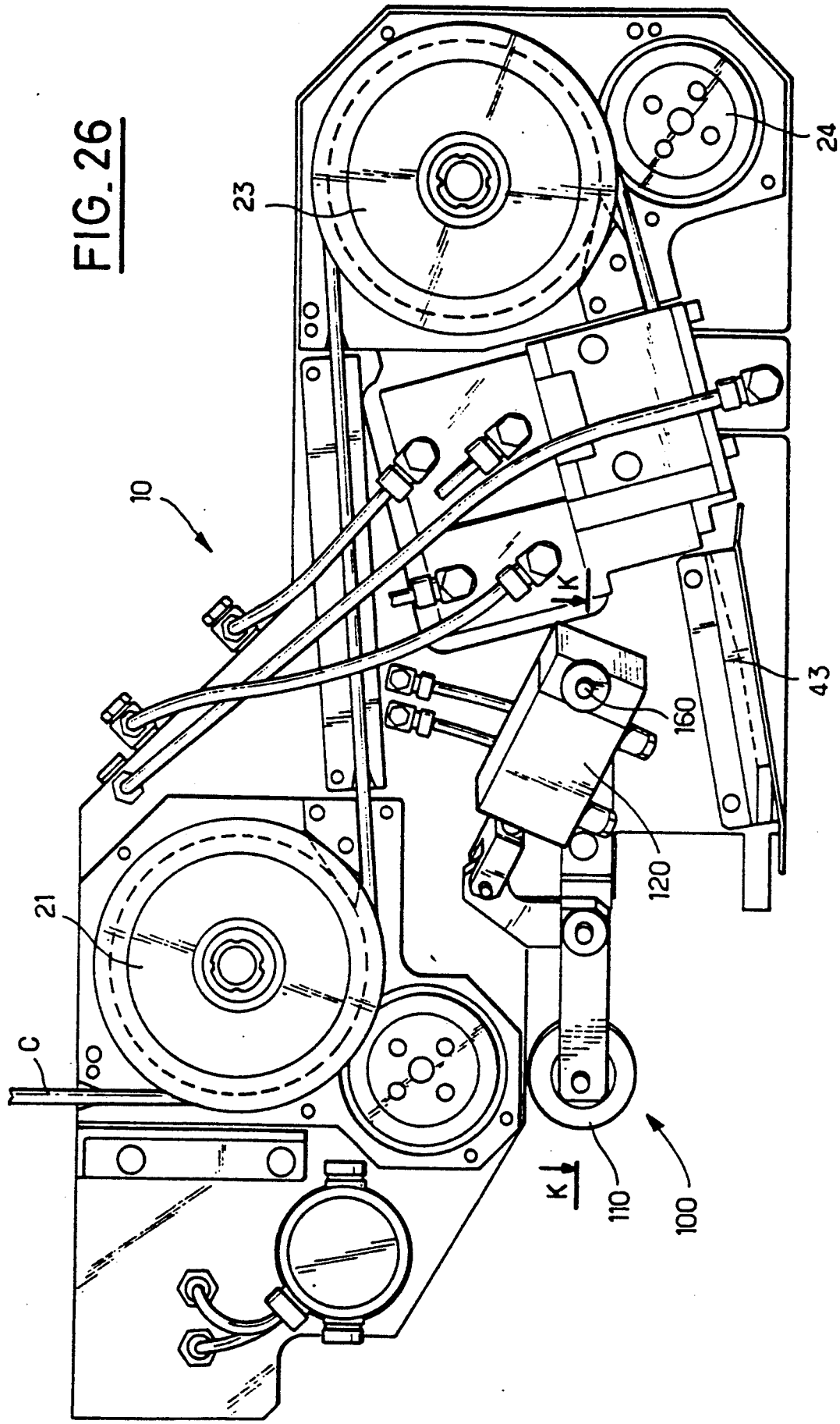
FIG. 26 is a side view of the manipulator head in accordance with the invention showing in particular the bearing and clamping members fitted to the carriage.

As can be seen in FIG. 26, the mobile bearing member 100 is fixed to the fixed part 10 of the manipulator head. It essentially comprises a roller 110 operated by an actuator 120.

The member 100 will now be described in more detail with reference to FIGS. 27 and 28.

An omega-shape member 150 supporting the mobile bearing member 100 is bolted to the fixed support part 10 of the manipulator head. One branch of the member 150 has the actuator 120 pivoted to it at an articulation 160 and the other branch of the member 120 has a cranked arm 130 pivoted to it at an articulation 140.

The mobile bearing roller 110 mounted on a fixed rotation shaft by means of a ball bearing is fixed to the outer end of this cranked arm.

Figure 27:
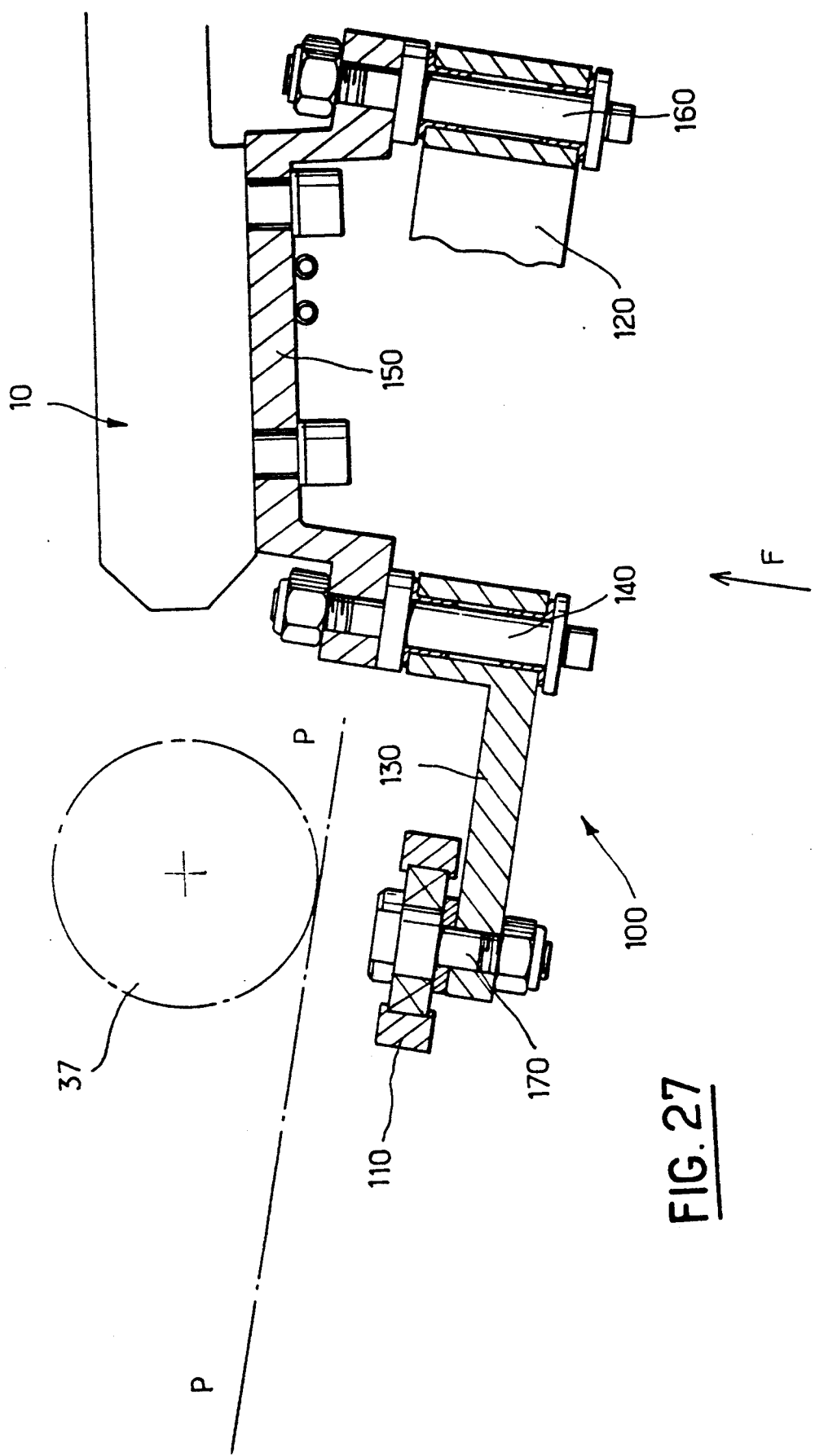
FIG. 27 is a view of the mobile bearing member in cross-section on the line K—K in FIG. 26.

FIG. 27 also shows the edge of the frame (chain-dotted line PP) and the position of the fitting roller 37 on the manipulator head mobile arm. The arrangement of the cranked arm 130 and the movement of the roller 110 from its idle position shown in full line to its active position shown in chain-dotted line are particularly clearly shown in FIG. 3.

The outer end of the cranked arm 130 carries the bearing roller 110, its other end being rotatably mounted at the end of the piston rod 121 of the actuator 120. The elbow in the cranked arm 130 is pivoted at an articulation 140 to one branch of the omega-shape member 150.

The operation of the mobile bearing member 110 will be easily understood. With reference to FIG. 28, operation of the actuator 121 deploys its piston rod to lower the bearing roller 110 onto the upper surface of the frame B. Simultaneously with movement of the manipulator head, the roller 110 rolls on the frame B, on which it exerts sufficient pressure. Reverse operation of the actuator returns the roller 110 from its active position to its idle position.

Figure 29:
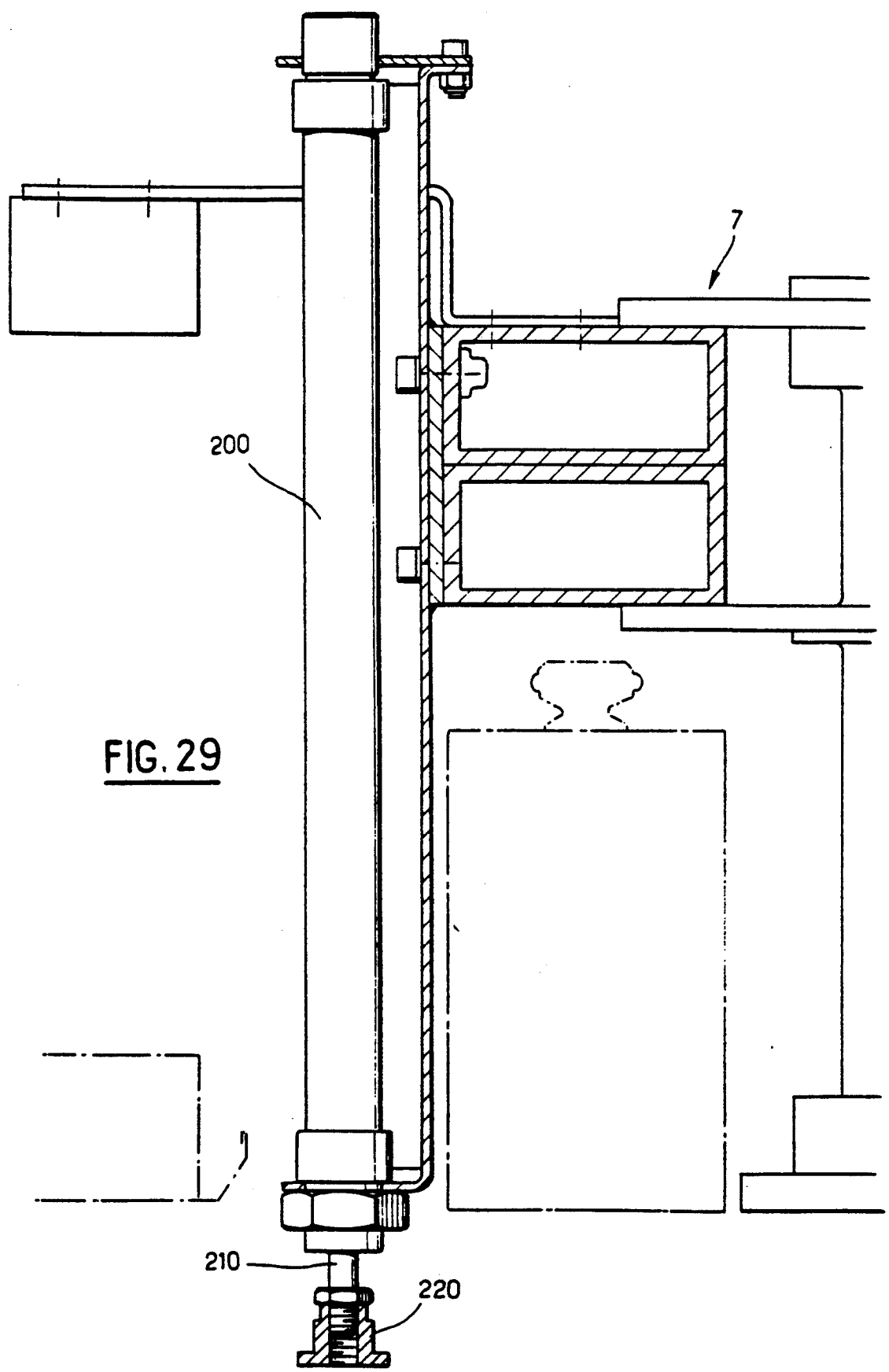
FIG. 29 is a side view of the single-point bearing member.

FIG. 29 shows the single-point bearing member which operates in a complementary way to the mobile roller 110.

The piston-and-cylinder actuator 200 is fixed vertically to one edge of the carriage 7. The lower end of its piston rod 210 is screwthreaded and carries a bearing skid 220 the height of which is adjustable by means of locknut.

Figure 28:
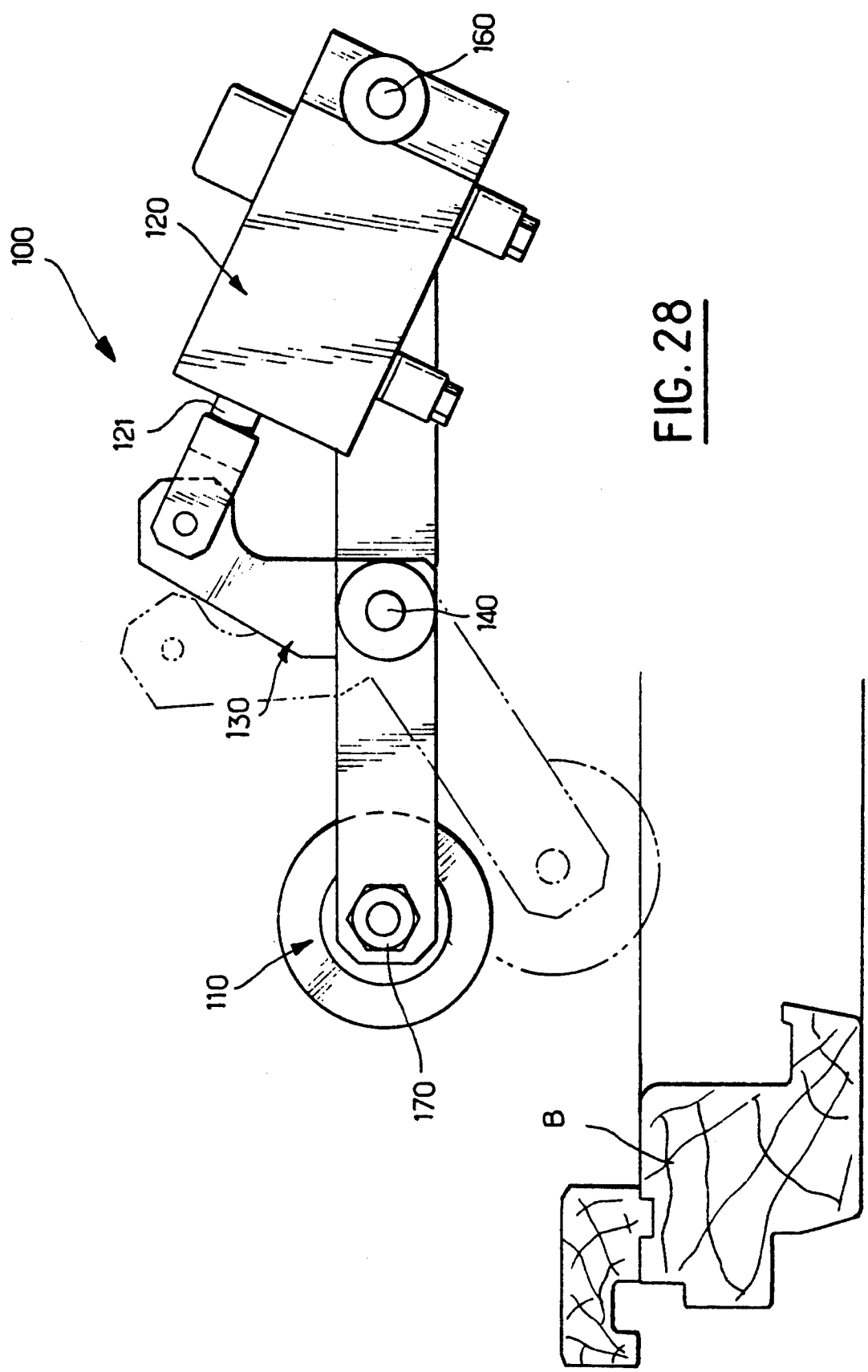
FIG. 28 is a view of the mobile bearing member as seen in the direction of the arrow F in FIG. 27.

To rotate the manipulator head to one or more corners of the frame B it is necessary to retract the bearing roller 110 into the position shown in full line in FIG. 28. At this time the single-point bearing actuator 200 is operated to take over from the roller 110 and apply the necessary clamping pressure to the frame B. After the manipulator head has rotated through one quarter-turn the actuator 200 is retracted and the roller 110 returned to the active position.

Finally, the machine for automatically fitting seals is also equipped with means for sensing French window frames.

In a preferred embodiment these sensing means are levers projecting from the loading table in the inactive state that can be lowered by lateral pressure. These levers are disposed on the loading table in such a way that when a window frame is mounted they offer no obstacle to it and are therefore not folded down. On the other hand, if a French window frame is placed on the loading table it applies lateral pressure to one or more levers, depending on its size, and folds them down. In this case the lever(s) folded down operate(s) a contactor. The relevant information is passed to the automatic control device of the machine by this contactor.

I claim:

1. A machine for automatically fitting a seal into a groove in a window opening frame comprising:
    a framework;
    frame feed means for feeding frames to be fitted with said seal to support means for supporting said frames in the vicinity of the framework;
    means for determining characteristics and dimensions of a frame fed by the frame feed means;
    a gantry movable along said framework;
    a carriage movable along said gantry; and
    a manipulator head rotatably mounted on the carriage, said manipulator head comprising cutting means for cutting the seal, seal fitting means for fitting the seal into the groove and means for guiding and feeding the seal to said cutting means.

2. The machine according to claim 1, wherein the manipulator head further comprises a fixed support, and an arm articulated to said fixed part at a first end and connected to the cutting means at another end.

3. The machine according to claim 2, wherein said seal fitting means comprises means for contacting an outer edge of the seal in a first direction, thereby inserting the outer edge into the groove, and pressing means for pressing the seal in a direction perpendicular to said first direction.

4. The machine according to claim 3, wherein said means for contacting comprises a roller which rotates about a spindle having a substantially vertical axis attached to said arm.

5. The machine according to claim 3, wherein said means for contacting comprises a roller which rotates about a spindle having a substantially horizontal axis attached to said arm.

6. The machine according to claim 3, wherein said pressing means comprises a finger fixed to said arm.

7. The machine according to claim 3, wherein said pressing means comprises a retractable and movable finger.

8. The machine according to claim 7, wherein said finger is pivotally mounted to rotate about an axis parallel to an axis of rotation of said manipulator head and is controlled by a piston-and-cylinder actuator.

9. The machine according to claim 1, wherein said cutting means comprises a cutting unit having two sets of blades, a first set of blades for making an angular cut and a second set of blades for making a straight cut, and double-action piston-and-cylinder actuators for operating said first and second sets of blades.

10. The machine according to claim 1, wherein said means for guiding and feeding the seal comprises an idle pulley which receives the seal from a hollow shaft in said carriage, a direction-changing pulley which receives the seal downstream of said idle pulley, a drive roller having a resilient tread which contacts and cooperates with said direction-changing pulley and variable speed driving means for driving said drive roller.

11. The machine according to claim 6, further comprising means for supporting the seal outside the frame at a corner of the frame during rotation of the head.

12. The machine according to claim 2, wherein said seal fitting means comprises a guide near the first end of said arm having a position and shape adapted to position the seal in said groove in the frame.

13. The machine according to claim 1, wherein said frame feed means comprises means for positioning a corner of a frame to be fitted with a seal in a reference corner on said support means.

14. The machine according to claim 13, further comprising means for removing a frame fitted with a seal from said support means, said means for removing cooperating with said means for positioning such that a frame fitted with a seal is removed from said predetermined reference corner while a frame to be fitted is positioned in said predetermined reference corner.

15. The machine according to claim 14, wherein said means for positioning and said means for removing perform synchronized reciprocating movements.

16. The machine according to claim 14, further comprising an edge on said support means which cooperates with said means for positioning to define said predetermined reference corner.

17. The machine according to claim 1, further comprising means for applying pressure to an upper surface of a frame on said support means, thereby holding said frame flat, said means for applying pressure being mounted to said carriage.

18. The machine according to claim 17, wherein said means for applying pressure is a vertically retractable roller attached to said manipulator head.

19. The machine according to claim 18, wherein said retractable roller is rotatable about a substantially horizontal axis.

20. The machine according to claim 19, further comprising a piston-and-cylinder actuator and a crank arm pivotally connected thereto, wherein said retractable roller is connected to said crank arm such that said actuator and said crank arm cooperate to move said roller between an active position and an idle position.

21. The machine according to claim 17, wherein said means for applying pressure comprises a single-point bearing member fixed to the carriage.

22. The machine according to claim 21, wherein said bearing member comprises a vertical piston-and-cylinder actuator having a piston rod and a bearing skid at an end of the piston rod.

23. The machine according to claim 1, further comprising means for sensing opening frames for French windows on said support means.

24. The machine according to claim 23, wherein said means for sensing comprises levers projecting from said support means which are foldable by lateral pressure and a contactor operated by said levers.

* * * * *